United States Patent Office 2,715,148
Patented Aug. 9, 1955

2,715,148

ELECTRIC STORAGE BATTERY

Carl Gritman and Charles A. Toce, Sunland, and Robert Broussard, Glendale, Calif., assignors to Electro-Acid Corporation, a corporation of Texas No Drawing. Application April 20, 1953,
Serial No. 349,944

3 Claims. (Cl. 136—26)

This application for patent is a companion to our application Serial Number 301,422, filed July 29, 1952, and entitled Electric Storage Battery and the invention relates to storage batteries of the well known lead-sulphuric acid type and to an improved electrolyte which is less destructive of the plates of the battery.

Among the objects of our invention is the provision of an electric storage battery of the sort indicated which is substantially free of detrimental sulphation; which has the capacity to permit the battery to be charged or discharged at rates which otherwise would either destroy the plates, or at least seriously impair or shorten the useful life thereof in the presence of the common dilute sulphuric acid electrolyte; which permits shipping and storage over long periods of time without attention; and which is less sensitive to shock, vibration and wide temperature changes than the conventional lead-sulphuric acid battery.

Other objects in part will be obvious and in part pointed out hereinafter.

The invention accordingly consists in the combination of elements, features of construction and arrangement of parts, and in the composition of ingredients and in their relative proportions, the scope of the useful application of which is more fully described below and is more particularly defined in the claims at the end of this specification.

As an aid to a better understanding of our invention it should be noted at this point that the common storage battery of the lead-sulphuric acid type employs plates of lead and lead dioxide and an electrolyte of dilute sulphuric acid of a density of about 1.275. As an incident to discharge, or perhaps to standing in discharged condition some sulphation takes place slowing up the current producing function and also slowing up the charging of the battery by obstruction of the movement of the electrolyte into and out of combination with the plates. The slowness of this action retards charging the battery at a rate in excess of about 6 amperes per cell or any prolonged discharge thereof in excess of that rate without danger of serious damage to the plates by loss of material or by buckling thereof. Attempts have been made heretofore to provide electrolytes which tend to prevent this so-called "sulphation" of the plates and/or which would permit increased charge and discharge rates without damage to the battery, but so far as is known, none of such proposals have shown any proved continued public acceptance.

With the foregoing considerations in mind, it is an object of the present invention to provide an improved storage battery having the common lead-lead dioxide type of plates together with an improved electrolyte having a capacity for a more rapid ion exchange into and out of the battery plates without deleterious effects on the physical structure of the plates.

A further object of the invention is to provide an electrolyte for the foregoing type of storage battery which will not adversely affect the battery plates through long standing in a charged or uncharged state.

Referring now more particularly to the structure of our invention, the battery may be of any of the usual physical structures for the lead-lead oxide types of batteries including the battery case of acid resistant material and at least one plate of lead dioxide forming the positive pole thereof and at least one plate of pure sponge lead forming the negative pole thereof. The electrolyte is formed according to the following formula:

|  | By volume |
|---|---|
| Sulphuric acid $H_2SO_4$ | 1/3 |
| Distilled water $H_2O$ | 2/3 |

To each 100 gallons of the above solution there is added the following: Either one or both of the ingredients selenic acid or selenious acid. The amount employed for 100 gallons of electrolyte is about one (1) pound.

After placing the foregoing electrolyte in the battery case with the said sponge lead and lead oxide plates, the battery is subjected to charging in the usual manner which may be at a rate as high as 100 amperes. It is then put on discharge until fully discharged.

While the exact chemical and electro-chemical reactions which take place incident to the charging and discharging of the battery are not conclusively known, the fact is that a battery employing the new electrolyte above described can be subjected to a charging rate of as much as 100 amperes for several hours without excessive heating and without damage to the plates; a treatment that would destroy any battery having only the common dilute sulphuric acid electrolyte. The discharge of the battery may be at equally high rates.

By way of test, a number of automobile batteries of different makes were purchased on the open market and were first fully charged at a rate that would not adversely affect the battery. These batteries together with a fully charged battery of the same size and embodying the present invention were subjected to breakdown tests which consisted in short circuiting the poles of each battery by means offering low resistance for successive periods of five seconds each. Of the purchased batteries, none survived more than 40 of such discharge intervals without being at least completely discharged. All of said purchased batteries heated excessively, in some cases, the battery case broke, in others the plates were badly warped, and in all cases the surface of the battery plates suffered inordinate losses of plate material. In contrast to the effects on these batteries the battery of the present invention experienced a slight rise in temperature and testing thereof was discontinued after 140 of such discharge intervals. On taking the battery apart for inspection after testing as above described, the plates were found to be in their original condition with no observable loss of material and no warping or other damage.

In the manufacture of the ordinary lead-acid storage battery, the plates are placed in the battery case with the dilute sulphuric acid electrolyte and the battery is charged at low rate. The electrolyte is then removed and fresh electrolyte of full strength is supplied. If the battery is not thereafter subjected to occasional charging to maintain it in substantially fully charged condition, it is subject to rapid deterioration. Thus the battery manufacturer must maintain the battery supplied with electrolyte and keep the battery charged until it is sold. The shipment of the acid-containing batteries is not only costly due to the added weight, but also, the shipment is hazardous due to the possibility of breakage or spillage with consequent damage to other shipments. Dry shipments and storage of the contact battery is practical because it readily sulphates. In contrast, in our battery, the plates may be placed in the electrolyte and charged at the previously specified high rate for, say, three and one-half hours. Following this the battery is put on discharge and fully discharged. The plates thereafter are removed from the electrolyte and dried. Thereafter, the plates may be merely placed in a case, distilled water added, and the battery charged. The resultant product is a fully charged battery.

For some reason as yet unknown, the hygroscopic character commonly encountered in the lead-sulphuric acid battery is destroyed although the dry plates possess the components which go into solution with water and produce the acid electrolyte at the proper strength when the battery is charged. While the plates are in said dry condition they may be freely handled with the bare hand. Thus not only is it possible to ship the battery in dry condition with reduced cost and increased safety, but the plates may likewise be shipped with still further savings in transportation costs and equally increased safety. Still further, the battery once formed and charged, will remain charged indefinitely without substantial loss of effectiveness.

The proportion of selenic acid or selenious acid to be added to the electrolyte may be varied somewhat, say, between .05 percent and .15 percent by weight, although the proportion of about .1 appears to be the optimum proportion.

A further advantage of the present invention is the discovery that the voltage per cell is increased from the usual 2 volts to about 2.2 volts. This may be the result of the fact that in the present invention the minute particles of action ingredients are increased in the selenic compound which deposits out and the attendant decrease in resistance to electron flow and the consequent increase in voltage noted. Whether this increased voltage is in fact due to a decreased resistance as above suggested or is due to an increased total electron release derived in some manner from the addition of the selenium compound which has not been determined, is not definitely known. But the facts are that the above-described combination of elements produces the recited results in output, in ability to safely withstand abnormal charging and discharge rates, in ability to maintain charged condition without need for constant charging input, and in the recited decrease in shipping costs and safety to other goods coming in contact therewith incident to shipment.

It will also be apparent that while the addition of the selenium component to the electrolyte is the most practicable mode of so doing, it may also be added in other manners such as a coating applied to the interior surface of the case or to the surface of the grid or the surfaces of the plates or that it can be incorporated in the plate material and more particularly in the lead dioxide plate. While it has not been definitely proved, it is suspected that the known property of certain selenium compounds for allowing current to pass therethrough in one direction and resisting current flow in the opposite direction may have some part in the novel, advantageous and valuable results achieved by the present invention. It does appear that the formation of some such selenium compound from the added selenic and/or selenious acid may be a possibility under the influence of electron flow either through the charging of the battery or possibly as an incident to discharge thereof.

While in the foregoing specification we have described certain practices of the invention, we do not thereby imply that the invention is to be deemed to be limited to the exact forms disclosed and it is to be understood that the invention embraces all such modifications as may come within the purview of the appended claims.

We claim:

1. In a storage battery, a fluid containing case, a positive plate composed principally of lead dioxide and a negative plate composed principally of sponge lead suspended in said case and disposed out of physical contact with each other, and an electrolyte filling said case and comprising a dilute solution of sulphuric acid having a specific gravity of about 1.275 and about 0.05% to 0.15% by weight of selenium compound of the group selenic acid and selenious acid.

2. In a storage battery of the lead-lead peroxide sulphuric acid type, an electrolyte essentially consisting of dilute sulphuric acid and about 0.05% to 0.15% by weight of compound of the group selenic acid and selenious acid.

3. An electrolyte for storage batteries of the lead-lead peroxide sulphuric acid type, essentially comprising dilute sulphuric acid, and about 0.1% by weight of selenium compound of the group selenic acid and selenious acid.

References Cited in the file of this patent

UNITED STATES PATENTS 2,649,766    Johnson _____ Aug. 25, 1953

FOREIGN PATENTS 17,674    Great Britain _____ of 1905

OTHER REFERENCES

Storage Batteries, 3rd edition, Vinal, 1940, pages 118, 119, 140 and 141, 307–311.

U. S. Department of Commerce, NBS Circular 504 "Battery Additives," pages 1–6, January 10, 1951.